:::
United States Patent [19]

Fujii

[11] 4,152,050
[45] May 1, 1979

[54] SHIFT LENS SYSTEM

[75] Inventor: Toru Fujii, Hino, Japan

[73] Assignee: Olympus Optical Company Limited, Tokyo, Japan

[21] Appl. No.: 844,390

[22] Filed: Oct. 21, 1977

[30] Foreign Application Priority Data

Oct. 29, 1976 [JP] Japan .................. 51-129314

[51] Int. Cl.² ............................... G02B 9/64
[52] U.S. Cl. ................... 350/247; 350/214
[58] Field of Search .......... 350/247, 178, 214

[56] References Cited

U.S. PATENT DOCUMENTS

| 3,254,227 | 5/1966 | Hock | 350/247 X |
| 3,655,260 | 4/1972 | Bartucci et al. | 350/214 X |
| 3,877,795 | 4/1975 | Yamashita | 350/214 |

Primary Examiner—Paul A. Sacher
Attorney, Agent, or Firm—Cushman, Darby & Cushman

[57] ABSTRACT

A shift lens system having a correcting means for correcting aggravation of aberrations to be caused when the lens system is shifted in parallel with the image surface. The correcting means is arranged to decenter at least one lens component in the lens system when the lens system is shifted and to thereby obtain a favorable image.

6 Claims, 6 Drawing Figures

SPHERICAL ABERRATION

ASTIGMATISM

DISTORTION

SPHERICAL ABERRATION

ASTIGMATISM

DISTORTION

SHIFT LENS SYSTEM

BACKGROUND OF THE INVENTION (a) Field of the Invention

The present invention relates to a shift lens system arranged to move the lens system in the direction parallel with the image surface and having a correcting means arranged to correct aberrations favourably when the lens system is shifted.

(b) Description of the Prior Art

Lens systems generally called shift lens systems are arranged to obtain the shift effect by moving the lens system as a whole in the direction parallel with the image surface. By arranging as above, it is generally possible to photograph a range of object of a field angle which is apparently larger than the field angle determined by the film size and, for the image obtained at that time, variation of magnification of image is not caused. However, the image circle for which it is possible to focus an image by the shift lens should be large enough to obtain satisfactory shift effect. For this purpose, the included field angle of the lens system should be made extremely large and this causes very large difficulty for correcting aberrations favourably. When, for example, a lens system having the focal length of 35 mm and film size of 24 × 36 mm is arranged so that it can be shifted by 11 mm in the diagonal direction of image surface, the field angle which should be included by this lens system becomes 84° though the field angle to be included by the ordinary lens system with 35 mm field angle is 64°. This field angle is approximately equal to the field angle of a lens system with the focal length of about 23 mm and film size of 24 × 36 mm. To include the field angle of 84° by a lens system with 35 mm focal length, it is necessary to keep the aperture efficiency large and, at the same time, to make the equality of image in the image circle high. It is, however, difficult to obtain such lens system because it is very difficult to correct curvature of field and coma favourably. For known shift lens systems, the equality of image in the marginal portion inevitably decreases when the lens system is shifted.

SUMMARY OF THE INVENTION

It is, therefore, a primary object of the present invention to provide a shift lens system arranged to shift the lens system and, at the same time, to decenter at least one lens component constituting the lens system by the amount in proportion to the shifting amount in order to intentionally make curvature of field asymmetrical so that extremely high quality of image is obtained in the image surface which is actually needed when the lens system is shifted.

It is widely known that coma, distortion and curvature of field vary when a part of lens system is decentered and the quality of image obtained by the lens system decreases. The present invention provides a favourable shift lens system by effectively utilizing aberrations, which are varied by decentering, to the shift lens system.

DETAILED DESCRIPTION OF THE PREFERRED EMBODIMENTS

Figure 1:
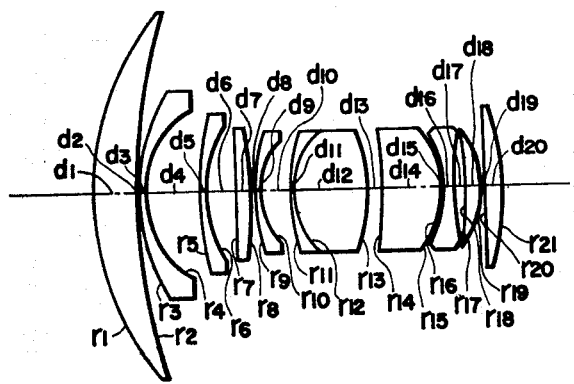
FIG. 1 shows a sectional view of the shift lens system according to the present invention.

Now, the shift lens system according to the present invention is described in detail referring to preferred embodiments. Here, the detailed description is given based on the lens system shown in FIG. 1, i.e., the lens system of ten-component eleven-element lens configuration comprising a first, second, third, fourth, fifth, sixth, seventh, eighth, ninth and tenth lens components in which the first lens component is a positive meniscus lens, the second and third lens components are respectively negative miniscus lenses, the fourth lens component is a positive lens, the fifth lens component is a negative meniscus lens, the sixth lens component is a positive cemented doublet, the seventh lens component is a positive meniscus lens, the eighth lens component is a negative lens, the ninth lens component is a positive meniscus lens, and the tenth lens component is a positive lens, said lens system having the following numerical data:

$f = 100$

| | | | |
|---|---|---|---|
| $r_1 = 194.884$ | | | |
| | $d_1 = 28.562$ | $n_1 = 1.618$ | $\nu_1 = 63.38$ |
| $r_2 = 383.204$ | | | |
| | $d_2 = 0.408$ | | |
| $r_3 = 122.152$ | | | |
| | $d_3 = 6.121$ | $n_2 = 1.79952$ | $\nu_2 = 42.24$ |
| $r_4 = 66.095$ | | | |
| | $d_4 = 36.968$ | | |
| $r_5 = 188.309$ | | | |
| | $d_5 = 4.896$ | $n_3 = 1.79952$ | $\nu_3 = 42.24$ |
| $r_6 = 80.086$ | | | |
| | $d_6 = 19.504$ | | |
| $r_7 = 3344.88$ | | | |
| | $d_7 = 12.241$ | $n_4 = 1.744$ | $\nu_4 = 44.78$ |
| $r_8 = -537.227$ | | | |
| | $d_8 = 0.408$ | | |
| $r_9 = 97.621$ | | | |
| | $d_9 = 4.896$ | $n_5 = 1.6516$ | $\nu_5 = 58.67$ |
| $r_{10} = 52.645$ | | | |
| | $d_{10} = 21.177$ | | |
| $r_{11} = 129.087$ | | | |
| | $d_{11} = 4.08$ | $n_6 = 1.734$ | $\nu_6 = 51.52$ |
| $r_{12} = 54.046$ | | | |
| | $d_{12} = 53.738$ | $n_7 = 1.64769$ | $\nu_7 = 33.8$ |
| $r_{13} = -88.815$ | | | |
| | $d_{13} = 7.589$ | | |
| $r_{14} = -210.541$ | | | |
| | $d_{14} = 42.925$ | $n_8 = 1.717$ | $\nu_8 = 47.94$ |
| $r_{15} = 59.557$ | | | |
| | $d_{15} = 0.404$ | | |
| $r_{16} = -59.253$ | | | |
| | $d_{16} = 6.12$ | $n_9 = 1.80518$ | $\nu_9 = 25.43$ |
| $r_{17} = 283.197$ | | | |
| | $d_{17} = 7.222$ | | |
| $r_{18} = -195.391$ | | | |

-continued

| | $d_{18} = 12.241$ | $n_{10} = 1.589$ | $\nu_{10} = 48.61$ |
|---|---|---|---|
| $r_{19} = -72.395$ | | | |
| | $d_{19} = 0.408$ | | |
| $r_{20} = 2662.984$ | | | |
| | $d_{20} = 14.281$ | $n_{11} = 1.58913$ | $\nu_{11} = 61.11$ |
| $r_{21} = 154.893$ | | | | wherein reference symbol f represents the focal length of the lens system as a whole, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

Figure 2:
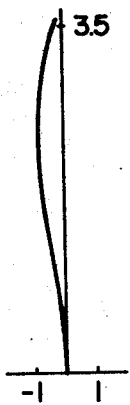
FIG. 2 shows graphs illustrating aberration curves of the lens system shown in FIG. 1.
Figure 2:
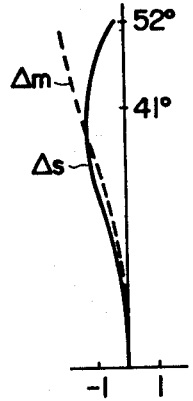
Figure 2:
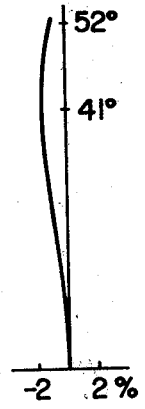

For the above-mentioned lenssystem, graphs of aberration curves are as shown in FIG. 2 and the included field angle is 41° on one side. When this lens system is shifted by moving the lens system as a whole in parallel with the image surface as in cases of known shift lens systems, the field angle which should be included is 52° on one side. As it is evident from FIG. 2, the image surface especially the meridional image surface will then be curved largely and aggravation of aberrations by offaxial rays is unavoidable.

Figure 3:
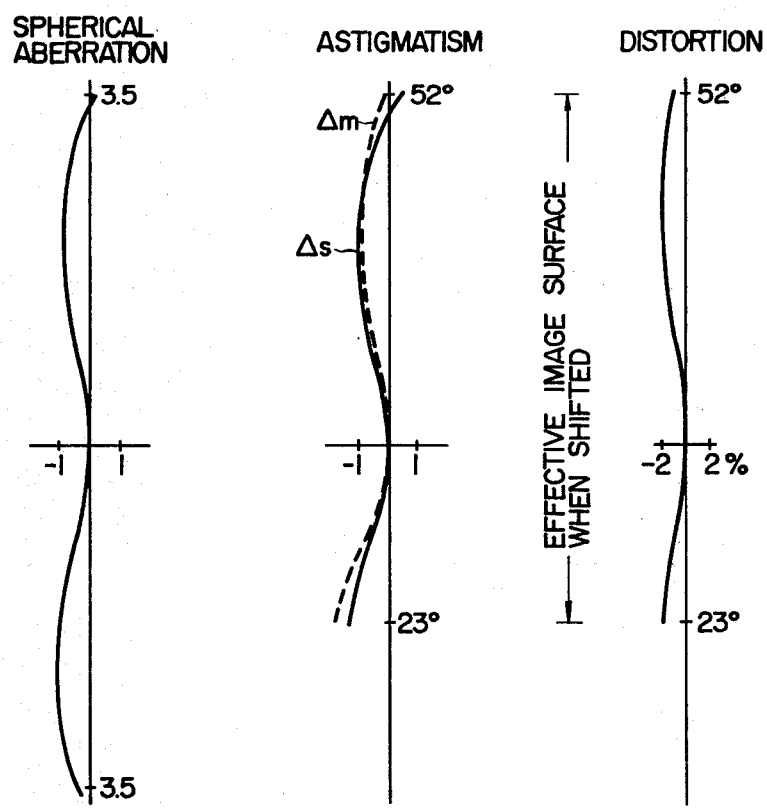
FIG. 3 shows graphs illustrating aberration curves obtained when the lens system shown in FIG. 1 is shifted as a whole and, at the same time, and the seventh through tenth lens components in the lens system are integrally decentered.

In a first example of the present invention, the lens system as a whole is shifted in the same way as above and, at the same time, the seventh through tenth lens components constituting the lens system are integrally shifted further 0.204 in the direction same as the shifting direction of the lens system. At that time, aberration curves of the lens system becomes as shown in graphs of FIG. 3. As it is evident from these graphs, curvature of field is extremely well balanced in the effective image surface, i.e., the area actually used for photographing.

Figure 4:
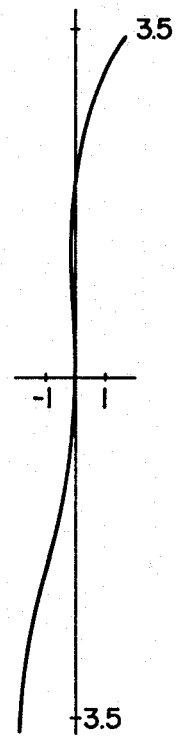
FIG. 4 shows graphs illustrating aberration curves obtained when the lens system shown in FIG. 1 is shifted as a whole and, at the same time, the tenth lens component is decentered.
Figure 4:
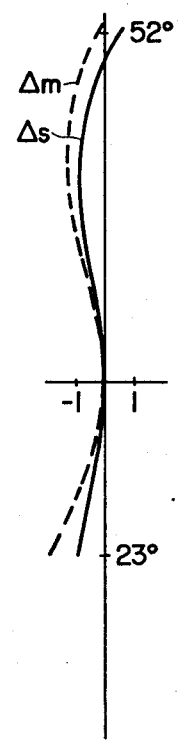
Figure 4:
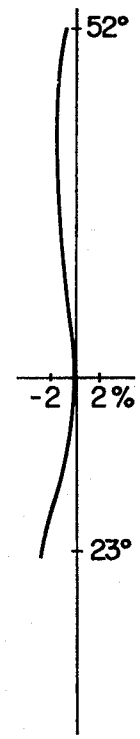

As a second example of the present invention, only the tenth lens component may be shifted further 2.04 in the direction same as the shifting direction of the lens system as a whole at the same time as the lens system as a whole is shifted. In this case, aberration curves become as shown in FIG. 4. In case of this example, slight asymmetry of spherical aberration occurs and, as a result, astigmatism occurs in the middle of image surface. However, they are negligibly small for practical use. Moreover, curvature of field in the marginal portion is well balanced in the effective image surface.

The amount of decentering (0.204 in the first example and 2.04 in the second example) of the pre-determined lens component or lens components at the time of shifting given in the above-mentioned two examples shows the maxmum amount of decentering at the fully shifted point. It is known that the amounts of variation of aberrations, when lens components are decentered, vary linearly within the range that the amount of decentering of lens components are not so large. Therefore, for obtaining a favourable image, it is effective to vary the amounts of decentering of lens components according to the amount of shifting of the lens system as a whole. As the lens component (or lens components) to be decentered, it is preferable to select such lens component that the variation of spherical aberration is small and variation of offaxial aberrations is large when it is decentered. For this purpose it is preferable that the lens system as a whole is arranged so that paraxial rays which enter the lens component to be decentered become parallel with the optical axis. Besides, when a lens component is decentered at the same time as shifting of the lens system as a whole, it is preferable to decenter a lens component (or lens components) which is arranged in rear of and comparatively distant from the stop and which is as simple as possible because it is more advantageous for construction of lens mount mechanism.

Figure 5:
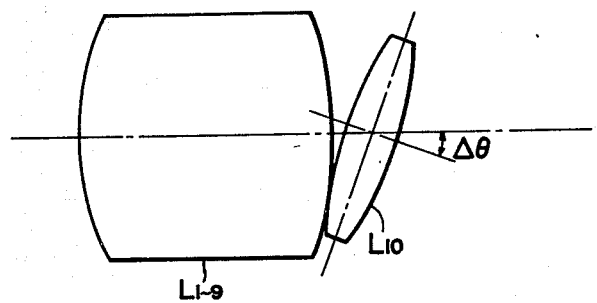
FIG. 5 shows an abridged drawing illustrating the state of the lens system when the lens system as a whole is shifted and, at the same time, a lens component is tilted.
Figure 6:
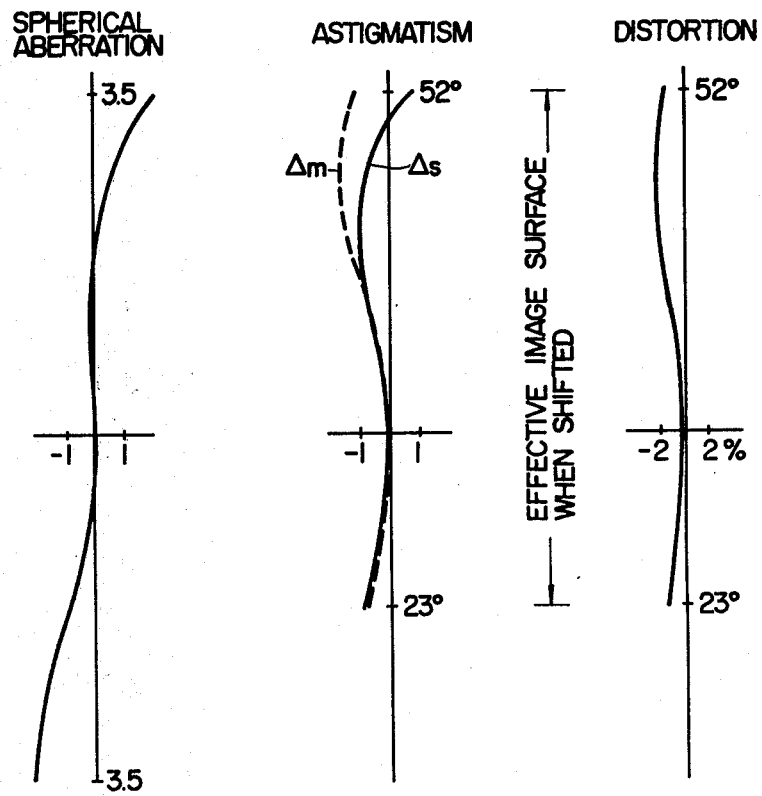
FIG. 6 shows graphs illustrating aberration curves obtained when the lens system as a whole is shifted and, at the same time, a component is tilted.

In the above two examples, at least one pre-determined lens component is decentered, at the same time as shifting of the lens system as a whole, by further moving that lens component in parallel with the image surface, i.e., by further moving the optical axis of that lens component in parallel with the optical axis of the lens system as a whole. But, it is also possible to obtain the similar effect by inclining the optical axis of at least one pre-determined lens component according to the amount of shifting of the lens system as a whole. This decentering method is illustrated by a third example described below. That is, in the lens system having lens configuration shown in FIG. 1, the tenth lens component may be inclined. In FIG. 5, reference symbol $L_{1-9}$ represents the first through ninth lens components in FIG. 1 in simplified form and reference symbol $L_{10}$ represents the tenth lens component. In the third example, the tenth lens component is inclined by $\Delta\theta$ as shown in FIG. 5 at the same time as the lens system as a whole is shifted downward in FIG. 5. That is, at the same time as the lens system as a whole is shifted in one direction, the tenth lens component is inclined in the direction that its end portion on the shifting direction side moves toward the object side. When $\Delta\theta$ is 80' in case that the amount of shifting of the lens system as a whole is 11 mm in the same way as the aforementioned examples, aberration curves after decentering become as shown in FIG. 6. As it is evident from FIG. 6, quality of image is favourable.

As explained in the above, the present invention provides a shift lens system arranged to decenter at least one lens component, at the same time as the lens system is shifted, by moving the optical axis of said lens component in parallel with the optical axis of the lens system as a whole or by inclining the optical axis of said lens component in respect to the optical axis of the lens system as a whole so that favourable quality of image is thereby obtained.

I claim:

1. A shift lens system comprising a plural number of lens components and arranged that the optical axis of said lens system is shifted and, at the same time, that at least one lens component constituting said lens system is decentered according to the amount of shifting so that aberrations are always kept favourably.

2. A shift lens system according to claim 1, in which at least one lens component constituting said lens system is decentered by moving the optical axis of said lens component in parallel with the optical axis of the lens system by an amount according to the shifting amount of the lens system.

3. A shift lens system according to claim 1, in which at least one lens component constituting said lens system is decentered by inclining the optical axis of said lens component in respect to the optical axis of the lens system by an amount according to the shifting amount of the lens system.

4. A shift lens system according to claim 1, in which said shift lens system comprises a first, second, third, fourth, fifth, sixth, seventh, eighth, ninth and tenth lens components, said first lens component being a positive meniscus lens, said second and third lens components respectively being negative meniscus lenses, said fourth lens component being a positive lens, said fifth lens component being a negative meniscus lens, said sixth lens component being a positive cemented doublet, said seventh lens component being a positive meniscus lens, said eighth lens component being a negative lens, said ninth lens component being a positive meniscus lens, said tenth lens component being a positive lens, said shift lens system having numerical values shown below and being arranged that said seventh through tenth lens components are integrally moved in parallel with the optical axis of the lens system by an amount according to the shifting amount of the lens system:

$f = 100$ $r_1 = 194.884$
$d_1 = 28.562$ $n_1 = 1.618$ $v_1 = 63.38$
$r_2 = 383.204$
$d_2 = 0.408$
$r_3 = 122.152$
$d_3 = 6.121$ $n_2 = 1.79952$ $v_2 = 42.24$
$r_4 = 66.095$
$d_4 = 36.968$
$r_5 = 188.309$
$d_5 = 4.896$ $n_3 = 1.79952$ $v_3 = 42.24$
$r_6 = 80.086$
$d_6 = 19.504$
$r_7 = 3344.88$
$d_7 = 12.241$ $n_4 = 1.744$ $v_4 = 44.78$
$r_8 = -537.227$
$d_8 = 0.408$
$r_9 = 97.621$
$d_9 = 4.896$ $n_5 = 1.6516$ $v_5 = 58.67$
$r_{10} = 52.645$
$d_{10} = 21.177$
$r_{11} = 129.087$
$d_{11} = 4.08$ $n_6 = 1.734$ $v_6 = 51.52$
$r_{12} = 54.046$
$d_{12} = 53.738$ $n_7 = 1.64769$ $v_7 = 33.8$
$r_{13} = -88.815$
$d_{13} = 7.589$

-continued $r_{14} = -210.541$
$d_{14} = 42.925$ $n_8 = 1.717$ $v_8 = 47.94$
$r_{15} = 59.557$
$d_{15} = 0.404$
$r_{16} = -59.253$
$d_{16} = 6.12$ $n_9 = 1.80518$ $v_9 = 25.43$
$r_{17} = 283.197$
$d_{17} = 7.222$
$r_{18} = -195.391$
$d_{18} = 12.241$ $n_{10} = 1.589$ $v_{10} = 48.61$
$r_{19} = -72.395$
$d_{19} = 0.408$
$r_{20} = 2662.984$
$d_{20} = 14.281$ $n_{11} = 1.58913$ $v_{11} = 61.11$
$r_{21} = 154.893$ wherein reference symbol f represents the focal length of the lens system as a whole, reference symbols $r_1$ through $r_{21}$ respectively represent radii of curvature of respective lens surfaces, reference symbols $d_1$ through $d_{20}$ respectively represent thicknesses of respective lenses and airspaces between respective lenses, reference symbols $n_1$ through $N_{11}$ respectively represent refractive indices of respective lenses, and reference symbols $v_1$ through $v_{11}$ respectively represent Abbe's numbers of respective lenses.

5. A shift lens system according to claim 4, in which said tenth lens component is moved, instead of said seventh through tenth lens components, in parallel with the optical axis of the lens system by an amount according to the shifting amount of the lens system.

6. A shift lens system according to claim 4, in which said tenth lens component is inclined in respect to the optical axis of the lens system by an amount according to the shifting amount of the lens system instead of integrally moving said seventh through tenth lens components in parallel with the optical axis of the lens system.

* * * * *